US011493764B2

(12) United States Patent
Chang

(10) Patent No.: US 11,493,764 B2
(45) Date of Patent: Nov. 8, 2022

(54) METHOD FOR DYNAMICALLY DISPLAYING REAL-WORLD SCENE, ELECTRONIC DEVICE, AND COMPUTER READABLE MEDIUM

(71) Applicant: HTC Corporation, Taoyuan (TW)

(72) Inventor: Yi-Hsin Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/893,392

(22) Filed: Jun. 4, 2020

(65) Prior Publication Data
US 2021/0382305 A1 Dec. 9, 2021

(51) Int. Cl.
G02B 27/01 (2006.01)

(52) U.S. Cl.
CPC .... *G02B 27/0172* (2013.01); *G02B 2027/014* (2013.01); *G02B 2027/0138* (2013.01); *G02B 2027/0178* (2013.01)

(58) Field of Classification Search
CPC .................... G02B 27/0172; G02B 2027/0138
See application file for complete search history.

(56) References Cited

U.S. PATENT DOCUMENTS

| 10,885,704 | B1* | 1/2021 | Hill .......................... G01S 17/89 |
| 2014/0364212 | A1 | 12/2014 | Osman et al. |
| 2016/0027212 | A1 | 1/2016 | Da Veiga et al. |
| 2017/0113702 | A1* | 4/2017 | Thieberger-Navon ...................... B60W 50/0097 |
| 2017/0236332 | A1* | 8/2017 | Kipman ................. G06F 3/016 345/633 |
| 2017/0287215 | A1 | 10/2017 | Lalonde et al. |
| 2017/0336863 | A1* | 11/2017 | Tilton ..................... A63F 13/00 |
| 2019/0070506 | A1 | 3/2019 | Stafford |
| 2019/0102953 | A1* | 4/2019 | Lindsay .................... G06T 7/20 |
| 2019/0373238 | A1 | 12/2019 | Shuster et al. |
| 2020/0134895 | A1 | 4/2020 | Pollard et al. |
| 2020/0293108 | A1* | 9/2020 | Georgiou .......... G02B 27/0172 |
| 2020/0307437 | A1* | 10/2020 | Thieberger ........... B62D 31/003 |

FOREIGN PATENT DOCUMENTS

| CN | 108597036 | 9/2018 |
| CN | 109813317 | 5/2019 |
| TW | 201822164 | 6/2018 |
| TW | 201839458 | 11/2018 |

OTHER PUBLICATIONS

"Office Action of Europe Counterpart Application", dated Dec. 7, 2021, p. 1-p. 6.
"Office Action of Taiwan Counterpart Application", dated Sep. 15, 2021, p. 1-p 7.
"Search Report of Europe Counterpart Application", dated Nov. 11, 2021, p. 1-p. 4.

* cited by examiner

Primary Examiner — Chun-Nan Lin
(74) Attorney, Agent, or Firm — JCIPRNET

(57) ABSTRACT

The invention provides a method for dynamically displaying real-world scene, an electronic device and a computer readable medium. The method includes: obtaining a virtual scene boundary of a virtual reality environment; monitoring a specific distance between a specific element in a virtual reality system and the virtual scene boundary; in response to determining that the specific distance ranges between a first threshold and a second threshold, displaying a see-through window in a virtual reality content of the virtual reality environment, wherein the see-through window displays a real-world scene.

19 Claims, 4 Drawing Sheets

METHOD FOR DYNAMICALLY DISPLAYING REAL-WORLD SCENE, ELECTRONIC DEVICE, AND COMPUTER READABLE MEDIUM

TECHNICAL FIELD

The invention relates to a virtual reality (VR) display technology, and more particularly, to a method for dynamically displaying real-world scene, an electronic device and a computer readable medium.

BACKGROUND

In the conventional art, when a user of VR is immersed in a VR environment, the user may move his/her body according to a VR content. To prevent the user from colliding with an object or a wall in a real-world scene while moving the body, a VR system can stop presenting the VR content when the user's body approaches a boundary of a virtual scene, and instead display the real-world scene in front of the user.

However, for the user, the above-mentioned approach may lead to a poor user experience as the user immersed in the VR environment is suddenly pulled back into the real-world scene.

SUMMARY

Accordingly, the invention provides a method for dynamically displaying real-world scene, an electronic device and a computer readable medium, which can be used to solve the technical problems above.

The invention provides a method for dynamically displaying real-world scene, including: obtaining a virtual scene boundary of a virtual reality environment; monitoring a first specific distance between a specific element in a virtual reality system and the virtual scene boundary, wherein the virtual reality system is configured to provide the virtual reality environment; and in response to determining that the first specific distance is greater than a first threshold and less than a second threshold, displaying a see-through window in a virtual reality content of the virtual reality environment, wherein the see-through window displays a real-world scene.

The invention provides an electronic device including a storage circuit and a processor. The storage unit stores a plurality of modules. The processor is coupled to the storage circuit, and accesses the modules to perform steps of: obtaining a virtual scene boundary of a virtual reality environment; monitoring a first specific distance between a specific element in a virtual reality system providing the virtual reality environment and the virtual scene boundary; and in response to determining that the first specific distance is greater than a first threshold and less than a second threshold, displaying a see-through window in a virtual reality content of the virtual reality environment, wherein the see-through window displays a real-world scene.

The invention provides a computer readable medium. The computer readable medium records an executable computer program, and the executable computer program is loaded by an electronic device to perform steps of: obtaining a virtual scene boundary of a virtual reality environment; monitoring a first specific distance between a specific element in a virtual reality system and the virtual scene boundary, wherein the virtual reality system is configured to provide the virtual reality environment; and in response to determining that the first specific distance is greater than a first threshold and less than a second threshold, displaying a see-through window in a virtual reality content of the virtual reality environment, wherein the see-through window displays a real-world scene.

Based on the above, the invention allows the user to learn more gently that he/she is close to the virtual scene boundary, thereby avoiding the poor experience.

DETAILED DESCRIPTION

Figure 1:
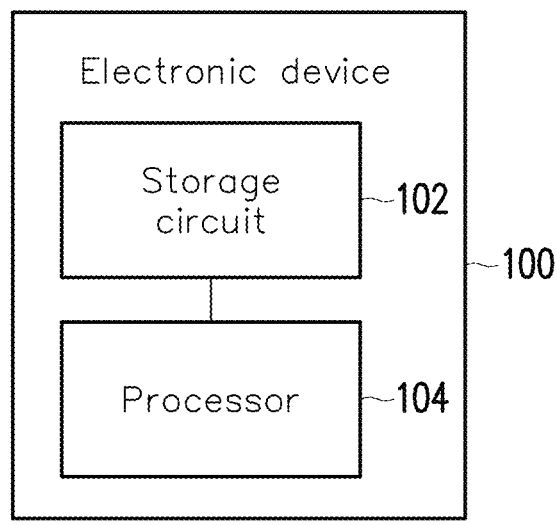
FIG. 1 is a schematic diagram of an electronic device illustrated according an embodiment of the invention.

Referring to FIG. 1, FIG. 1 is a schematic diagram of an electronic device illustrated according an embodiment of the invention. In different embodiments, an electronic device 100 is, for example, a computer device in a VR system for providing/generating a VR content. The VR content may be presented to a wearer of a head-mounted display through the head-mounted display in the VR system, but not limited thereto.

As shown by FIG. 1, the electronic device 100 may include a storage circuit 102 and a processor 104. The storage circuit 102 is, for example, any forms of fixed or movable random access memory (RAM), read only memory (ROM), flash memory, hard disk or other similar devices, or a combination of above-said devices, which can be used to record a plurality of program codes or modules.

The processor 104 is coupled to the storage circuit 102, and may be a processor for general purposes, a processor for special purposes, a conventional processor, a digital signal processor, a plurality of microprocessors, one or more microprocessors, controllers and microcontrollers which are combined with a core of the digital signal processor, an application specific integrated circuit (ASIC), a field programmable gate array (FPGA), any other integrated circuits, a state machine, a processor based on advanced RISC machine (ARM) and the like.

In the embodiments of the invention, the processor 104 may access the modules and the program codes recorded in the storage circuit 102 to realize the method for dynamically displaying real-world scene proposed by the invention.

Figure 2:
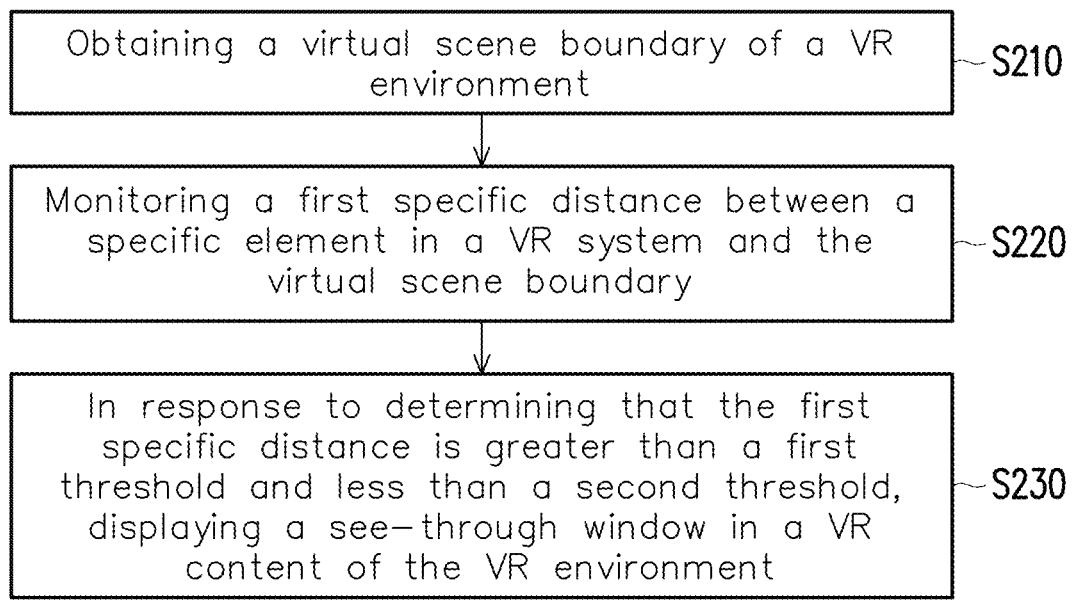
FIG. 2 is a flowchart of a method for dynamically displaying real-world scene illustrated according to an embodiment of the invention.

Referring to FIG. 2, FIG. 2 is a flowchart of a method for dynamically displaying real-world scene illustrated according to an embodiment of the invention. The method of this embodiment may be executed by the electronic device 100 of FIG. 1, and details of each step of FIG. 2 are described below with reference to each element shown in FIG. 1.

First, in step S210, the processor 104 may obtain a virtual scene boundary of a VR environment. In an embodiment, this virtual scene boundary may be set by a user when setting up the VR system, and may generally represent a boundary of a movable space in a real environment when the user uses the VR system. In an embodiment, the VR environment is provided by the VR system to which the electronic device 100 belongs, for example. In general, the VR system may include elements such as a head-mounted display, a position tracking device, and/or a controller that can be held by the user. In the process of installing the VR system, the user will normally sets the corresponding virtual scene boundary according to the requirements of the VR system. Therefore, the processor 104 may directly access the relevant system setup to obtain the virtual scene boundary, but the invention is not limited thereto.

Then, in step S220, the processor 104 may monitor a first specific distance between a specific element in the VR system and the virtual scene boundary, which may represent a distance between the user and the virtual scene boundary. In different embodiments, the specific component may be the head-mounted display or the controller in a VR system, but not limited thereto.

Next, in step S230, in response to determining that the first specific distance is greater than a first threshold and less than a second threshold (which is greater than the first threshold), the processor 104 may display a see-through window in a VR content of the VR environment. For better understanding of the above concept, the following description is provided with reference to FIG. 3A to FIG. 3C.

Figure 3A:
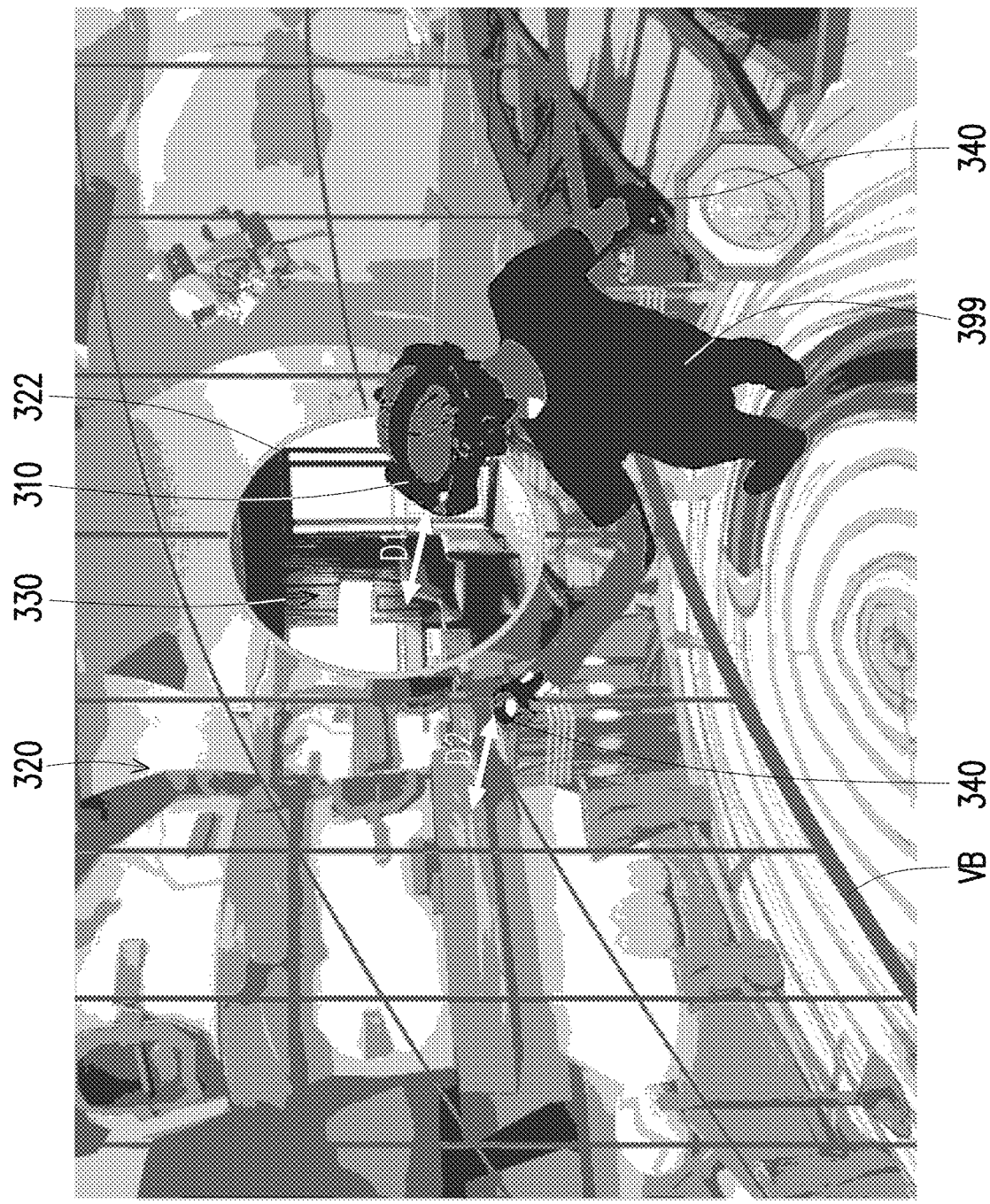
FIG. 3A is a schematic diagram of a see-through window displayed in a VR content illustrated according to an embodiment of the invention.

Referring to FIG. 3A, FIG. 3A is a schematic diagram of a see-through window displayed in a VR content illustrated according to an embodiment of the invention. In this embodiment, it is assumed that a head-mounted display 310 is the specific element described above. In this case, the processor 104 may monitor a first specific distance D1 between the head-mounted display 310 and a virtual scene boundary VB (which may be understood as a virtual lattice wall shown in FIG. 3A or other forms of walls, but not limited thereto), and display a see-through window 322 in a virtual reality content 320 when the first specific distance D1 ranges between a first threshold (e.g., 0 cm) and a second threshold (e.g., 50 cm). Here, the see-through window 322 displays a real-world scene 330. In another embodiment, the see-through window 322 is displayed in the VR content 320 once the first specific distance D1 is less than the second threshold, regardless of the first threshold.

In an embodiment, the specific element may be the controller in the VR system. In this case, the processor 104 may monitor a second specific distance D2 between the controller and the virtual scene boundary VB, and display the see-through window 322 in the virtual reality content 320 for displaying the real-world scene 330 when the second specific distance D2 ranges between a third threshold and a fourth threshold (e.g., 50 cm). The first specific distance D1 and the second specific distance D2 may be the same or different; the first threshold and the third threshold may be the same or different; the second threshold and the fourth threshold may be the same or different. In another embodiment, the see-through window 322 is displayed in the VR content 320 once the second specific distance D2 is less than the fourth threshold.

In an embodiment, the head-mounted display 310 may have a front lens. The front lens may be used to capture the real-world scene in front of a wearer 399 of the head-mounted display 310. In addition, when the processor 104 displays the see-through window 322 in the VR content 320, the processor 104 may use a part of the real-world scene captured by the front lens as the real-world scene 330 to be presented in the see-through window 322.

Thus, it can be seen that, compared with the conventional technique of directly switching the entire VR content to the real-world scene, the invention can allow the wearer 399 to more gently learn that he/she is gradually approaching the virtual scene boundary through the see-through window 322 according to the distance between the wearer 399 and the boundary of the VR environment, so as to prevent the wearer 399 immersed in the VR environment from having the poor experience.

In some embodiments, a center point of the see-through window 322 may correspond to a gaze center point of the wearer 399. In other words, when the gaze center point of the wearer 399 changes due to the behavior of turning head, looking up, etc., a position of the see-through window 322 will also change accordingly. In this way, the displayed real-world scene may also present the real-world scene under the corresponding perspective.

In addition, in some embodiments, the processor 104 may also monitor a third specific distance between a controller 340 in the VR system and the virtual scene boundary VB. Further, in response to determining that the third specific distance is less than a fifth threshold (which may be a system setup or may be set based by the designer's demand), the processor 104 may display the virtual scene boundary VB in the VR content 320. In short, when the controller 340 is closer to the virtual scene boundary VB, the processor 104 may display the virtual scene boundary VB (e.g., the lattice wall in FIG. 3A) in the VR content 320 to prompt the wearer 399 that he/her is now close to the virtual scene boundary VB. On the other hand, when the controller 340 is far away from the virtual scene boundary VB, the processor 104 may stop displaying the virtual scene boundary VB in the VR content 320, so that the wearer 399 is better immersed in the VR environment. However, the invention is not limited in this regard.

In addition, after the see-through window 322 is presented, the processor 104 may continue to monitor the first specific distance D1. In an embodiment, if the first specific distance D1 is changed to be greater than the second threshold, the processor 104 may stop displaying the see-through window 322 accordingly so that the wearer 399 can view the entire VR content 320, but not limited thereto.

Figure 3B:
FIG. 3B is a schematic diagram of increasing a size of the see-through window illustrated according to the embodiment of FIG. 3A.

In an embodiment, a size of the see-through window 322 may be negatively related to the first specific distance D1. In other words, if the first specific distance D1 becomes smaller, a size of the see-through window 322 will become greater, and vice versa. Referring to FIG. 3B, FIG. 3B is a schematic diagram of increasing a size of the see-through window illustrated according to the embodiment of FIG. 3A.

In FIG. 3B, it is assumed that the wearer 399 is closer to the virtual scene boundary VB than the scenario of FIG. 3A, so that the first specific distance D1 in FIG. 3B is smaller than the first specific distance D1 in FIG. 3A. In this case, the size of the see-through window 322 in FIG. 3B may become greater than the size of the see-through window 322 in FIG. 3A, so that the wearer 399 may observe the real-world scene 330 with a larger range.

Figure 3C:
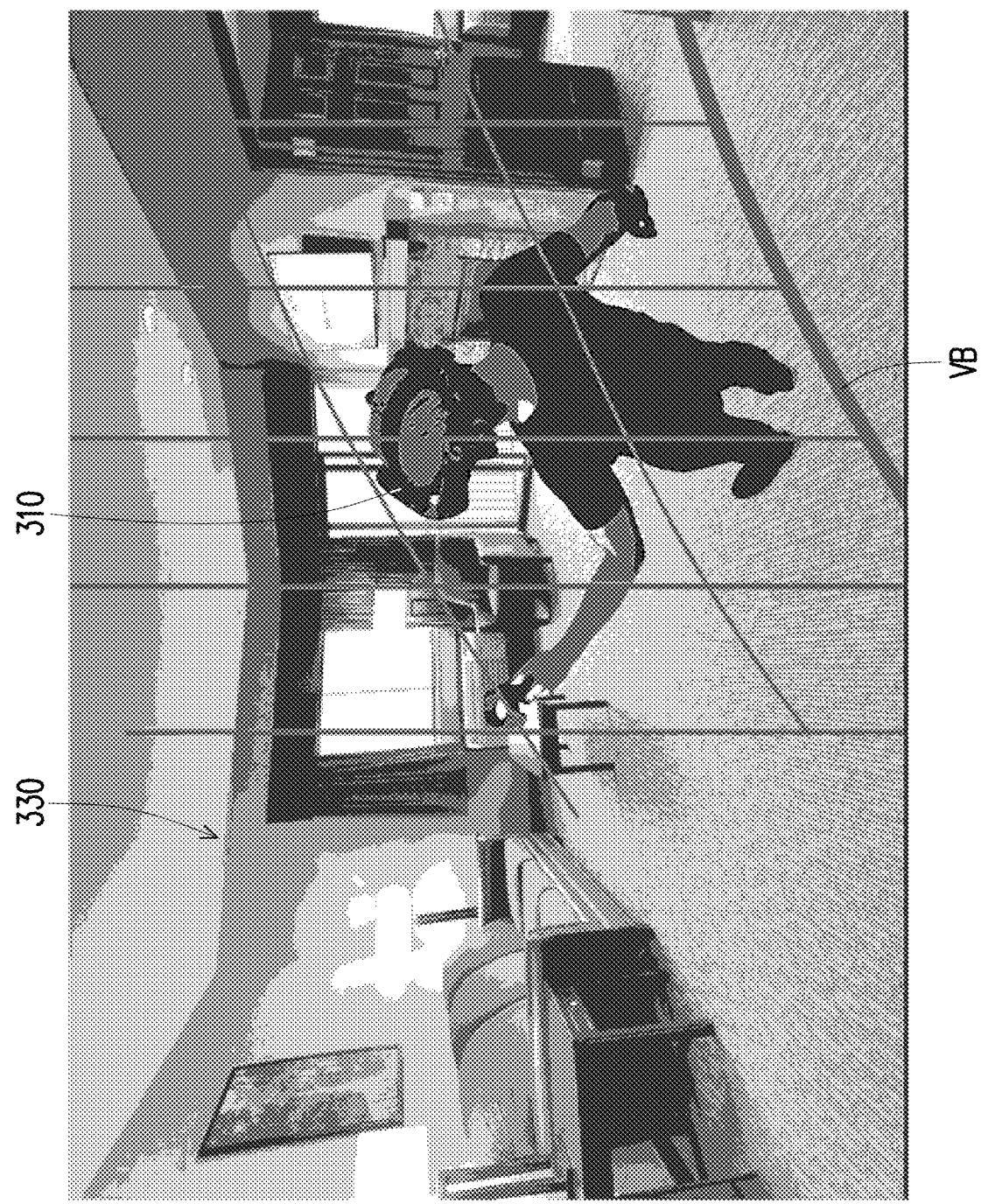
FIG. 3C is a schematic diagram of stopping displaying the VR content according to FIG. 3A and FIG. 3B.

Referring to FIG. 3C, FIG. 3C is a schematic diagram of stopping displaying the VR content according to FIG. 3A and FIG. 3B. In this embodiment, it is assumed that the wearer 399 continues to move toward the virtual scene boundary VB until the head-mounted display 120 reaches or exceeds the virtual scene boundary VB. At this time, the processor 104 may stop displaying the VR content, so that the wearer 399 can view the complete real-world scene 330 in front of him/her. That is, at this time, the head-mounted display 310 may directly present a view captured by the front lens to the wearer 399 for viewing, but not limited thereto.

From another point of view, the see-through window 320 may be understood as a window connecting the VR environment and the real-world. In this case, as the wearer 399 gradually approaches the virtual scene boundary VB, the wearer 399 may sense that a size of the see-through window 320 gradually increases. When the head-mounted display 310 exceeds the virtual scene boundary VB, the wearer 399 may experience a novel feeling of protruding the head through the see-through window 320 into the real-world.

In addition, the see-through window 322 is depicted as a round shape in each of the foregoing embodiments. Nonetheless, in other embodiments, the shape of the see-through window may be any geometric pattern (e.g., various polygons, but not limited thereto) the based on the designer's demand.

In some embodiments, a boundary between the real-world scene and the VR environment displayed by the see-through window 32 may be blurred, so that the boundary between the real-world scene and the VR environment does not look too sharp and weird.

The invention further provides a computer readable medium for performing the method for dynamically displaying real-world scene. The computer readable medium is composed of a plurality program commands recorded therein (e.g., setup program commands and deployment program commands). These program commands may be loaded into the electronic device 100 and executed by the electronic device 100 to perform the method of dynamically displaying real-world scene and the above-mentioned functions.

In summary, the invention may continuously monitor the first specific distance between the specific element (e.g., the head-mounted display) in the VR system and the virtual scene boundary, and present the see-through window for displaying (a part of) the real-world scene in the VR content when the first specific distance ranges between the first threshold and the second threshold. Accordingly, the user can learn more gently that he/she is close to the virtual scene boundary, thereby improving the user experience.

In addition, in some embodiments, the size of the see-through window may gradually increase as the first specific distance decreases, so that the wearer can more slowly realize that he/she is gradually approaching the boundary of the virtual scene, thereby improving the user experience. In addition, when the first specific distance is changed to be less than the first threshold value (e.g., 0 cm), the invention may also stop displaying the VR content, so that the wearer may view the entire real-world scene in front of him, thereby providing a novel user experience.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The invention claimed is:

1. A method for dynamically displaying real-world scene, comprising:
   capturing a real-world scene in front of a user of an electronic device with a front lens;
   obtaining a virtual scene boundary of a virtual reality environment;
   monitoring a first specific distance between a specific element in a virtual reality system and the virtual scene boundary, wherein the virtual reality system is configured to provide the virtual reality environment; and
   in response to determining that the first specific distance is greater than a first threshold and less than a second threshold, displaying a see-through window in a virtual reality content of the virtual reality environment,
   wherein the second threshold is greater than the first threshold, and the see-through window displays the real-world scene captured by the front lens, wherein a size of the see-through window is negatively related to the first specific distance,
   wherein in response to determining that the first specific distance becomes smaller, adjusting the size of the see-through window to be greater;
   in response to determining that the first specific distance becomes greater, adjusting the size of the see-through window to be smaller.

2. The method of claim 1, wherein the specific element is a head-mounted display in the virtual reality system.

3. The method of claim 1, wherein the specific element is a controller in the virtual reality system.

4. The method of claim 1, wherein the first threshold is 0.

5. The method of claim 1, further comprising:
   monitoring a second specific distance between a controller in the virtual reality system and the virtual scene boundary;
   in response to determining that the second specific distance is less than a third threshold, displaying the virtual scene boundary in the virtual reality content.

6. The method of claim 1, wherein in response to determining that the first specific distance is less than the first threshold, the method further comprises stopping providing the virtual reality content.

7. The method of claim 1, wherein after the step of displaying the see-through window in the virtual reality content of the virtual reality environment, the method further comprises:
   in response to determining that the first specific distance is changed to be greater than the second threshold, stopping displaying the see-through window.

8. The method of claim 1, wherein the virtual reality system comprises the electronic device, and the electronic device is a head-mounted display.

9. The method of claim 1, wherein the virtual reality system comprises a head-mounted display, and a center point of the see-through window corresponds to a gaze center point of a wearer of the head-mounted display.

10. An electronic device, comprising:
    a front lens, capturing a real-world scene in front of a user of the electronic device;
    a storage circuit, storing a plurality of modules; and
    a processor, coupled to the storage circuit and the front lens, and accessing the modules to perform:
       obtaining a virtual scene boundary of a virtual reality environment;
       monitoring a first specific distance between a specific element in a virtual reality system providing the virtual reality environment and the virtual scene boundary; and
       in response to determining that the first specific distance is greater than a first threshold and less than a second threshold, displaying a see-through window in a virtual reality content of the virtual reality environment, wherein the second threshold is greater than the first threshold, and the see-through window displays the real-world scene captured by the front lens, wherein a size of the see-through window is negatively related to the first specific distance, wherein in response to determining that the first specific distance becomes smaller, adjusting the size of the see-through window to be greater;

in response to determining that the first specific distance becomes greater, adjusting the size of the see-through window to be smaller.

11. The electronic device of claim 10, wherein the specific element is a head-mounted display in the virtual reality system.

12. The electronic device of claim 10, wherein the specific element is a controller in the virtual reality system.

13. The electronic device of claim 10, wherein the first threshold is 0.

14. The electronic device of claim 10, wherein the processor is further configured for:

monitoring a second specific distance between a controller in the virtual reality system and the virtual scene boundary;

in response to determining that the second specific distance is less than a third threshold, displaying the virtual scene boundary in the virtual reality content.

15. The electronic device of claim 10, wherein in response to determining that the first specific distance is less than the first threshold, the processor is further configured to stop providing the virtual reality content.

16. The electronic device of claim 10, wherein after the see-through window is displayed in the virtual reality content of the virtual reality environment, the processor is further configured for:

in response to determining that the first specific distance is changed to be greater than the second threshold, stopping displaying the see-through window.

17. The electronic device of claim 10, wherein the electronic device is a head-mounted display of the virtual reality system.

18. The electronic device of claim 10, wherein the virtual reality system comprises a head-mounted display, and a center point of the see-through window corresponds to a gaze center point of a wearer of the head-mounted display.

19. A non-transitory computer readable medium, the computer readable medium recording an executable computer program, the executable computer program being loaded by an electronic device to perform steps of:

capturing a real-world scene in front of a user of the electronic device with a front lens;

obtaining a virtual scene boundary of a virtual reality environment;

monitoring a first specific distance between a specific element in a virtual reality system and the virtual scene boundary, wherein the virtual reality system is configured to provide the virtual reality environment; and in response to determining that the first specific distance is greater than a first threshold and less than a second threshold, displaying a see-through window in a virtual reality content of the virtual reality environment, wherein the second threshold is greater than the first threshold, and the see-through window displays the real-world scene captured by the front lens, wherein a size of the see-through window is negatively related to the first specific distance, wherein in response to determining that the first specific distance becomes smaller, adjusting the size of the see-through window to be greater;

in response to determining that the first specific distance becomes greater, adjusting the size of the see-through window to be smaller.

* * * * *